UNITED STATES PATENT OFFICE.

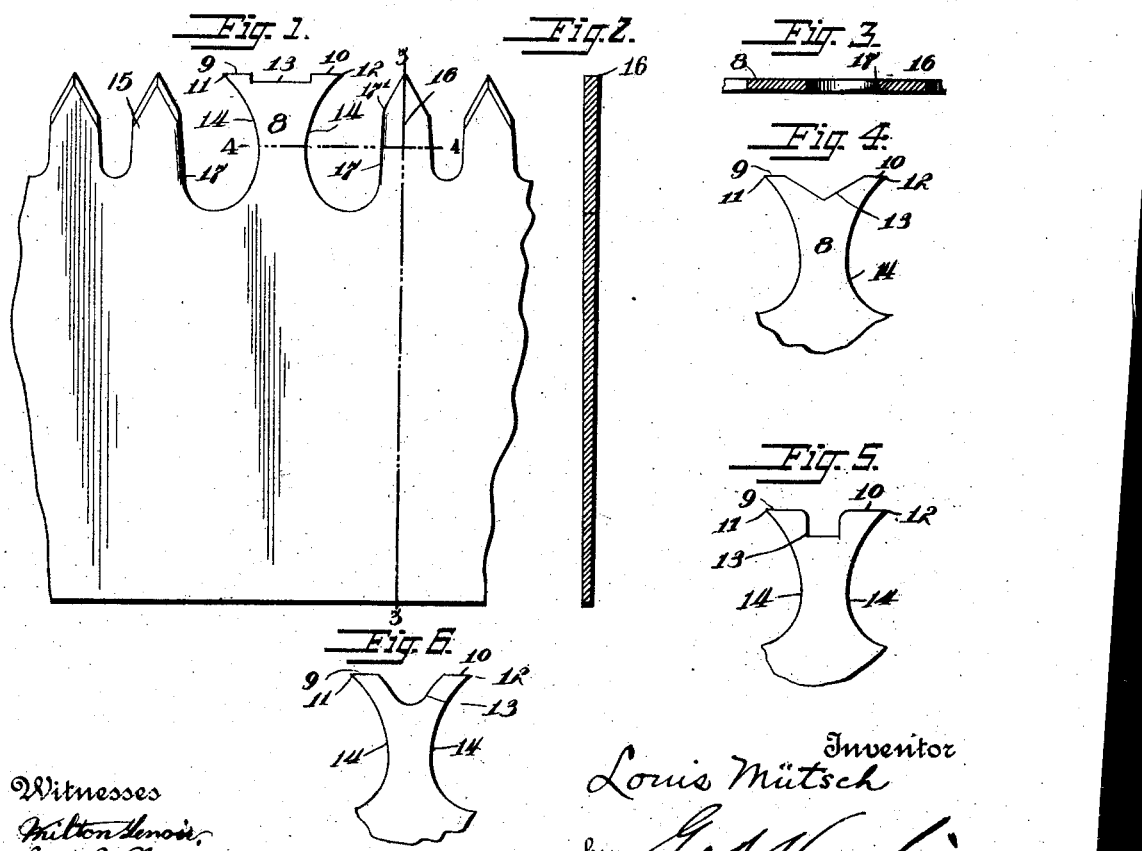

LOUIS MÜTSCH, OF SPOKANE, WASHINGTON.

CROSSCUT-SAW.

No. 854,102.  Specification of Letters Patent.  Patented May 21, 1907.

Application filed February 16, 1906. Serial No. 301,462.

*To all whom it may concern:*

Be it known that I, LOUIS MÜTSCH, a citizen of the United States, residing at Spokane, county of Spokane, and State of Washington, have invented certain new and useful Improvements in Crosscut-Saws, of which the following is a specification.

This invention relates to cross-cut saws.

The object of the present invention is the provision of an improved form of raker tooth and gullet for cross-cut saws, whereby the defects incident to the ordinary raker tooth and gullet of a cross-cut saw are obviated.

The raker tooth commonly used on cross-cut saws does poor work because improperly shaped and meets the wood at right-angles. To overcome this difficulty and obtain better results, the sawyer is compelled to re-shape the raker by swaging or hammering down the points of the raker. This is a tedious and delicate operation and must be very carefully done, particularly in winter when the temperature is below freezing, for then the points of the raker tooth are easily broken by the hammer. The ordinary gullet of a cross-cut saw is flanked by square faces which cause the shavings to become packed in the gullet and not to properly drop therefrom when the blade clears the log.

In carrying out the present invention, to accomplish the objects above stated, I provide the improved raker tooth forming a part of this invention, which has flattened bearing surfaces to support the saw in action, the tooth between said bearing surfaces being notched or cut-out so as to reduce the friction to a minimum by lessening the bearing surfaces, the opposite cutting points of the raker tooth being ready for use when the saw comes from the factory, and the construction being such that the sharpening, after use, can be accomplished by filing down the bearing surfaces and the notch as found desirable.

In carrying out the present invention, a gullet is provided whose bounding margins are rounded both by cutting out the sides of the raker tooth and curving the side of the cutting tooth and also rounding the side of the cutting tooth in a peculiar manner, thereby providing a gullet in which it is impossible for the shavings to pack but, on the contrary, the gullet being adapted to efficiently clear itself when emerging from the log.

The detailed construction of the invention is set forth fully hereinafter and the novel features are recited in the appended claims.

In the accompanying drawings:—Figure 1 is a view of a cross-cut saw having a raker tooth and gullet constructed according to my invention; Fig. 2, a section on line 3—3 of Fig. 1, illustrating how the saw blade may be made tapering or wedge-shaped; Fig. 3, a section on line 4—4 of Fig. 1; and Figs. 4, 5 and 6, modifications of the notch or cut-out portion of the raker tooth.

To obviate the disadvantages incident to the ordinary cross-cut saw, I have devised the improved raker tooth and gullet shown in Fig. 1, wherein the raker tooth 8 is provided with flat bearing surfaces 9 and 10 on an exact level with each other and having the cutting points 11 and 12. The surfaces 9 and 10 support the saw in action, but to reduce the friction to a minimum, the tooth is cut out or notched at 13 between the surfaces 9 and 10. This notched or cut-out portion 13 may be shallow in order that the raker tooth will not be unduly weakened, but it is obvious that the notch may assume other shapes, such as shown in Figs. 4, 5 and 6. The surfaces 9 and 10 should be perfectly level, that is, not inclined to either side toward the center of the raker, which would cause the raker points 11 and 12 to dig into the wood and cause it to tear, and if a tough dead knot should be encountered, there would be danger of breaking the sharp cutting edge of the raker, especially in freezing weather. It will be understood that the height of the raker tooth determines whether thick or thin shavings will be cut and that the raker tooth can be adjusted to the proper height at any time by filing off the surfaces 9 and 10 and filing down the notch 13 with an ordinary flat file, an operation which may be accomplished easily and rapidly.

I wish it distinctly understood that the cut-out portion 13 may be of a number of different forms and not necessarily restricted to those illustrated. This cut-out portion may be shallow or deep and narrow or wide, but of course, it should not be so wide that the bearing surfaces 9 and 10 will not properly support the saw, nor so narrow that the surfaces 9 and 10 are so extensive that there will be undue friction, while on the other hand, this notched portion 13 should not be so deep or of such shape that it will unduly weaken the raker tooth.

The side edges 14 of the raker tooth are cut on a uniform curve so that the cutting edge of the raker tooth will always be the same though the height of the tooth be gradually lowered by filing away the surfaces 9 and 10, besides which, a larger gullet is provided than with the old construction and the square face of the old style gullet is done away with. The edges of the cutting teeth 15 and 16 adjacent the raker tooth are rounded transversely at 17 beginning at the bottom of the gullet and continuing to the top of the cutting tooth, and this rounding of the cutting tooth reduces to a minimum the surface presented to the shavings carried in the gullet, so that the shavings will more easily drop out of the gullet and not pack therein. This rounded surface will not tend to turn the shavings into the kerf and clog the saw for the reason that while the raker tooth cuts along the kerf, it at the same time carries forward the shavings in the gullet, because the faces presented by the surfaces 14, viewed in cross-section, are square, as shown in Fig. 3; and completely fill up the kerf.

The transverse rounding of the surface 17 is most pronounced at the outlet mouth of the gullet or top portion of the teeth, as at 17' in order that the shavings may more easily drop out and the transverse convexity diminishes toward the base of the gullet.

As shown in Fig. 2, it is preferable (though not essential) to have the saw blade tapering in cross-section, being wider at the toothed or cutting edge and narrower at the back, but the blade is of uniform thickness throughout its length. A blade of this shape has small chance to bind and the friction is minimized, while there is less tendency for pitch to stick to the blade when soft timber is being sawed.

Having thus described my invention, what I claim as new and desire to secure by Letters Patent, is:—

1. As a new article of manufacture, a raker tooth for saws which has opposite raker points, relatively long, flat straight supporting surfaces on the same level with each other to support the saw in action, and an intermediate notch or cut-out portion between said flat supporting surfaces.

2. A raker tooth for saws having its opposite edges which are at the sides of the gullets made on entrant curves, and its outer portion provided with flat supporting surfaces to support the saw in action and having an intermediate cut-out portion, whereby the cutting edges of the raker tooth may be sharpened by filing away its said flat supporting surfaces and will always remain the same regardless of the height of the tooth.

3. A saw having a raker tooth and a sharpened cutting tooth, with an intervening gullet, said cutting tooth having a transversely curved or rounded edge adjacent the gullet and below the sharpened part of the cutting tooth.

4. A saw having a raker tooth and a sharpened cutting tooth, with an intervening gullet, said cutting tooth having a transversely curved or rounded edge merging into the gullet.

5. A saw having a raker tooth and a cutting tooth, with an intervening gullet, the raker tooth having its edge which bounds the gullet of concave shape, and said cutting tooth having its edge bounding the gullet curved or rounded transversely in more or less convex shape.

6. A saw having a raker tooth and a sharpened cutting tooth, with an intervening gullet, said cutting tooth having a transversely curved or rounded edge adjacent the gullet and below the sharpened part of the cutting tooth which gradually diminishes from relatively great convexity to relatively small convexity adjacent the gullet.

In testimony whereof, I hereunto affix my signature in presence of two witnesses.

LOUIS MÜTSCH.

Witnesses:
 JOHN B. HESS,
 MARY BLEFGEN.